United States Patent [19]

Evrard

[11] Patent Number: 5,316,127
[45] Date of Patent: May 31, 1994

[54] APPARATUS FOR LOADING CONTAINERS ON A CONVEYOR

[75] Inventor: Alain Evrard, Le Havre, France

[73] Assignee: Sidel, Le Havre Cedex, France

[21] Appl. No.: 67,627

[22] Filed: May 28, 1993

[30] Foreign Application Priority Data

Jun. 5, 1992 [FR] France .................. 92 06838

[51] Int. Cl.⁵ .................................. B65G 47/86
[52] U.S. Cl. ..................... 198/470.1; 198/803.15
[58] Field of Search ............ 198/470.1, 474.1, 478.1, 198/483.1, 803.3, 803.9, 803.12, 803.15

[56] References Cited

U.S. PATENT DOCUMENTS

| | | | |
|---|---|---|---|
| 2,308,154 | 1/1943 | Carter | 198/470.1 X |
| 2,349,638 | 5/1944 | Schreiber | 198/470.1 |
| 3,330,400 | 7/1967 | Alexander | 198/470.1 |
| 3,710,928 | 1/1973 | Van Zijp | 198/803.9 |
| 3,754,637 | 8/1973 | Carter et al. | 198/470.1 |
| 3,863,753 | 2/1975 | Shank, Jr. | 198/680 |
| 3,866,737 | 2/1975 | Simon | 198/803.15 X |
| 3,975,260 | 8/1976 | Peyton et al. | 198/803.9 X |
| 4,512,456 | 4/1985 | Peyton | 198/470.1 |

FOREIGN PATENT DOCUMENTS 9017262 5/1991 Fed. Rep. of Germany .
1411962 10/1975 United Kingdom .

Primary Examiner—D. Glenn Dayoan
Assistant Examiner—James R. Bidwell
Attorney, Agent, or Firm—Sughrue, Mion, Zinn, Macpeak and Seas

[57] ABSTRACT

Apparatus for loading necked containers on a conveyor chain 3, 9 equipped with individual neck-gripping mandrels 4, 16, the mandrels and the containers being spaced apart by the same pitch P. The conveyor chain turns around an axis 11 such that the mandrels describe an arc-shaped path within the loading area. A rotating disk 1 for picking up the arriving containers is fitted with recesses 5 for individually housing the containers spaced apart by the pitch P, the disk being located beneath the conveyor chain and rotating in the same direction thereas around an axis 6 parallel to the axis 11 but offset therefrom. The diameter of the disk and the respective positions of the axes is such that the circular path of the recesses intersects the arc-shaped path of the mandrels at an angle of about 3°.

8 Claims, 3 Drawing Sheets

APPARATUS FOR LOADING CONTAINERS ON A CONVEYOR

BACKGROUND OF THE INVENTION

This invention concerns an apparatus for feeding plastic containers having necks, in particular bottles, to a conveyor equipped with devices for individually gripping the containers by their necks, the gripping devices being spaced apart by a predetermined pitch and the containers being fed to the apparatus one after the other and separated by the same pitch.

In container-manufacturing and/or filling equipment, the containers are, according to wide-spread practice, transported by transfer wheels, of which numerous embodiments are known. However, since these wheels perform only a transfer function, they are not mechanically structured to support stresses, such as vertical stresses engendered, for example, by forcibly driving a mandrel into the necks of the containers supported by the wheels.

Moreover, in the manufacturing equipment ovens used to heat the plastic material of the containers, container transfer may be accomplished by disks containing recesses which grasp the containers and bring them into position beneath the moving mandrels. However, in these conventional pieces of equipment the mandrels travel rectilinearly; the containers must, therefore, be transferred within the area of rectilinear travel of the mandrels, thereby requiring significant space for the equipment.

SUMMARY OF THE INVENTION

This invention improves the loading apparatuses by eliminating the difficulties exhibited by previous apparatuses, and provides a perfected loading apparatus which is mechanically structured so as to support the vertical stresses exerted on the containers gripped by the machine, and which is compactly configured, thus making it less bulky than a number of conventional apparatuses.

To these ends, a loading apparatus of the type mentioned in the introduction and laid out according to the invention comprises:

a) a circular or arc-shaped conveyor, in the loading area, turning in a given direction around an axis of rotation, with the gripping devices supported by the conveyor describing an arc-shaped path having a predetermined diameter and running around the same axis;

b) a rotating disk for housing the containers fed to the apparatus, equipped at or near its periphery with individual container-housing means, which incorporate a mutual spacing pitch identical to the predetermined pitch, the disk being positioned beneath the conveyor and rotating in the same direction thereas around an axis parallel to the conveyor axis, the diameter of the disk and the respective positions of the conveyor and disk axes being such that, in plane projection, the circular path of the necks of the housing means incorporated into the disk intersects the arc-shaped path of the gripping devices;

c) means for controlling the gripping devices so that they grip the container necks at the instant they reach the intersection of the paths; and d) means for synchronous rotational drive of the conveyor and the pick-up disk, so that the gripping devices on the conveyor reach in succession the intersection of paths in synchronism with the housing means of the disk.

Thus, the pick-up disk which grasps the containers as they arrive and feeds them to the conveyor, and the conveyor itself, at least in that portion of its path which coincides with the pick-up disk, are superposed rotating structures, and the step involving container loading from the pick-up disk onto the conveyor occurs in a curved (circular) portion of the path. As a result, the longitudinal span of the machine equipped with the loading device is reduced.

Furthermore, because the length of the curved portion of the path required for loading is relatively small, use may be made of a following portion of the circular path of the containers picked up by the conveyor in order to process or begin to process the containers within this curved area. Here again, a reduction of the overall bulk of the machine is achieved.

Moreover, the conveyor may be mechanically structured to make it as strong as desired, in particular in order to withstand vertical stresses such as those generated, for example, by forcibly driving a mandrel into the neck of each container.

Finally, by virtue of the fact that the containers fed by the pick-up disk and the gripping devices follow secant, and not tangent, circular paths, two advantages are obtained:

1) geometrically, the vertical coincidence of each gripping device and of each container is much better delineated than in the case of the tangent paths; and 2) mechanically, vertical coincidence may be ensured more easily and more reliably over time, while unavoidable instances of play appearing with time would make coincidence by means of tangent paths more random and less reliable.

Moreover, secant paths allow faster disengagement of the disk once the container is grasped by the conveyor, and they avoid the interference of moving parts in some assembly and operating configurations of the loading apparatus.

The disk is preferably configured so that its container-housing means follow a circular trajectory having the abovementioned predetermined diameter and the axis of rotation of the disk is spaced apart from the axis of rotation of the conveyor to create the intersection of the respective paths of the gripping devices and the housing means. Correct operation of the apparatus is obtained when the angle of intersection of the two paths is approximately 2° to 5°, and preferably 3°.

The axis of rotation of the disk is advantageously offset in relation to the axis of rotation of the conveyor element, so that, on the far side of the intersection (in the direction of rotation) of the two paths, the housing means move away from the gripping devices and to the inside of the arc-shaped path followed by them. Thus, the empty housing means from which the containers have been unloaded no longer interfere with the containers once they have been picked up by the gripping devices, as was suggested above.

In a preferred embodiment, the apparatus comprises:

i) a vertical rotating shaft supporting the conveyor;

ii) a rotationally-generated stationary cap through which the shaft passes in free rotation and which is offset in relation thereto; and iii) a revolving hub mounted in free rotation around the cap, the hub being fastened to the disk, which extends underneath the conveyor.

In this case, it is advantageous to simplify the design of the apparatus by using the same motorized means for the rotational drive of the disk and the conveyor. For this purpose, the synchronous drive means actuating the conveyor element and the disk comprise:

a) a motor driving the shaft in rotation;
b) an intermediate shaft parallel to the motor shaft supporting the conveyor element and offset in relation thereto;
c) a first rotational-motion transmission between the motor shaft and the intermediate shaft serving to drive the intermediate shaft in rotation; and
d) a second rotational-motion transmission between the intermediate shaft and the disk hub, the transmission ratios of the first and second transmissions being such that the gripping devices and the housing means reach in succession the point of intersection of their respective paths.

The first and second rotational-motion transmissions are simple belt-and-pulley transmissions.

In a special embodiment of the apparatus, the conveyor comprises an endless conveyor chain equipped with the gripping devices and a wheel supporting and driving the chain. The gripping devices supported by the chain describe the arc-shaped path of predetermined diameter when the chain travels over the wheel. In this case, the vertical rotating shaft supports the wheel driving the endless chain.

DETAILED DESCRIPTION OF THE PREFERRED EMBODIMENT

Figure 1:
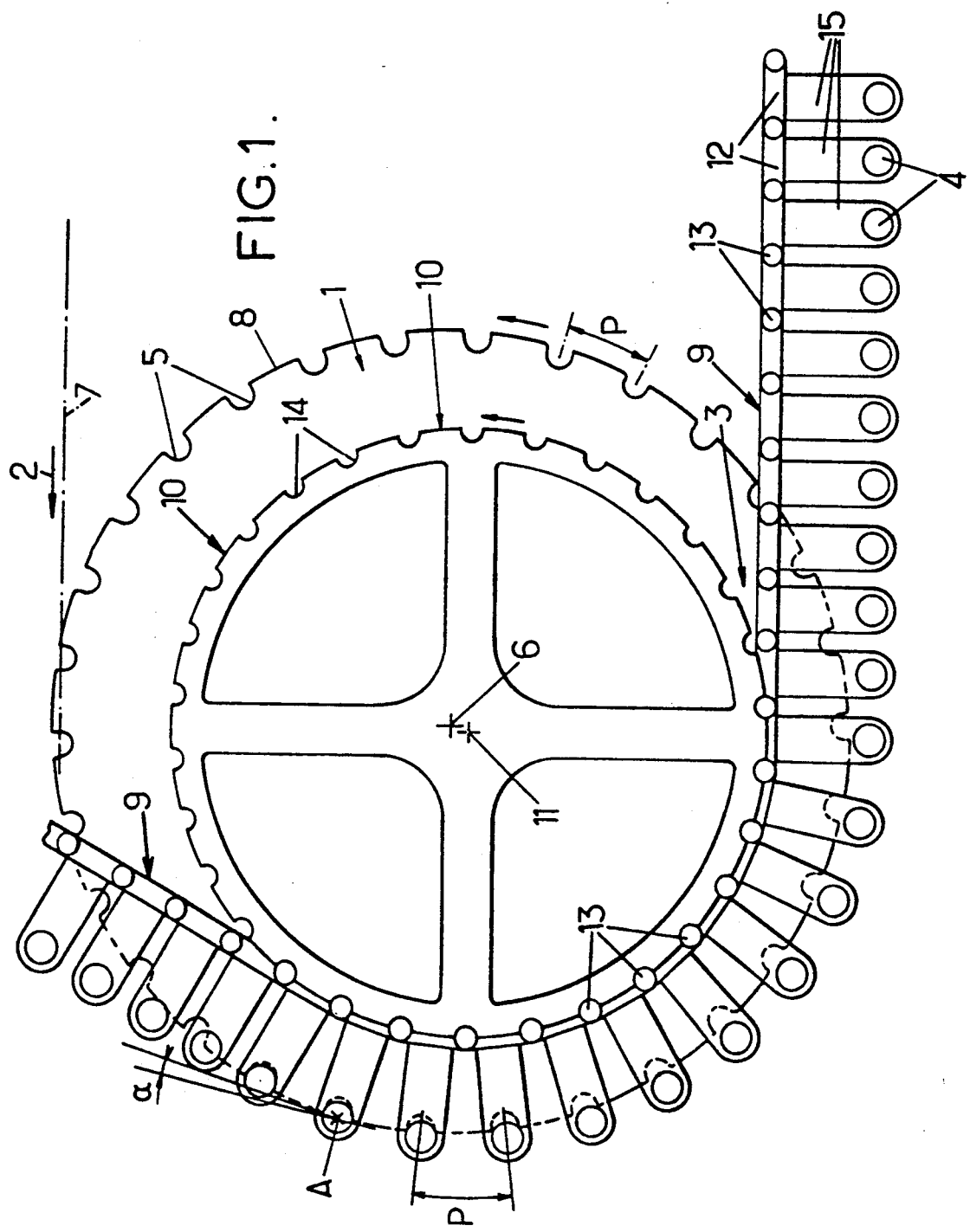
FIG. 1 is a diagrammatic top view of a loading apparatus configured in accordance with the invention.
Figure 2:
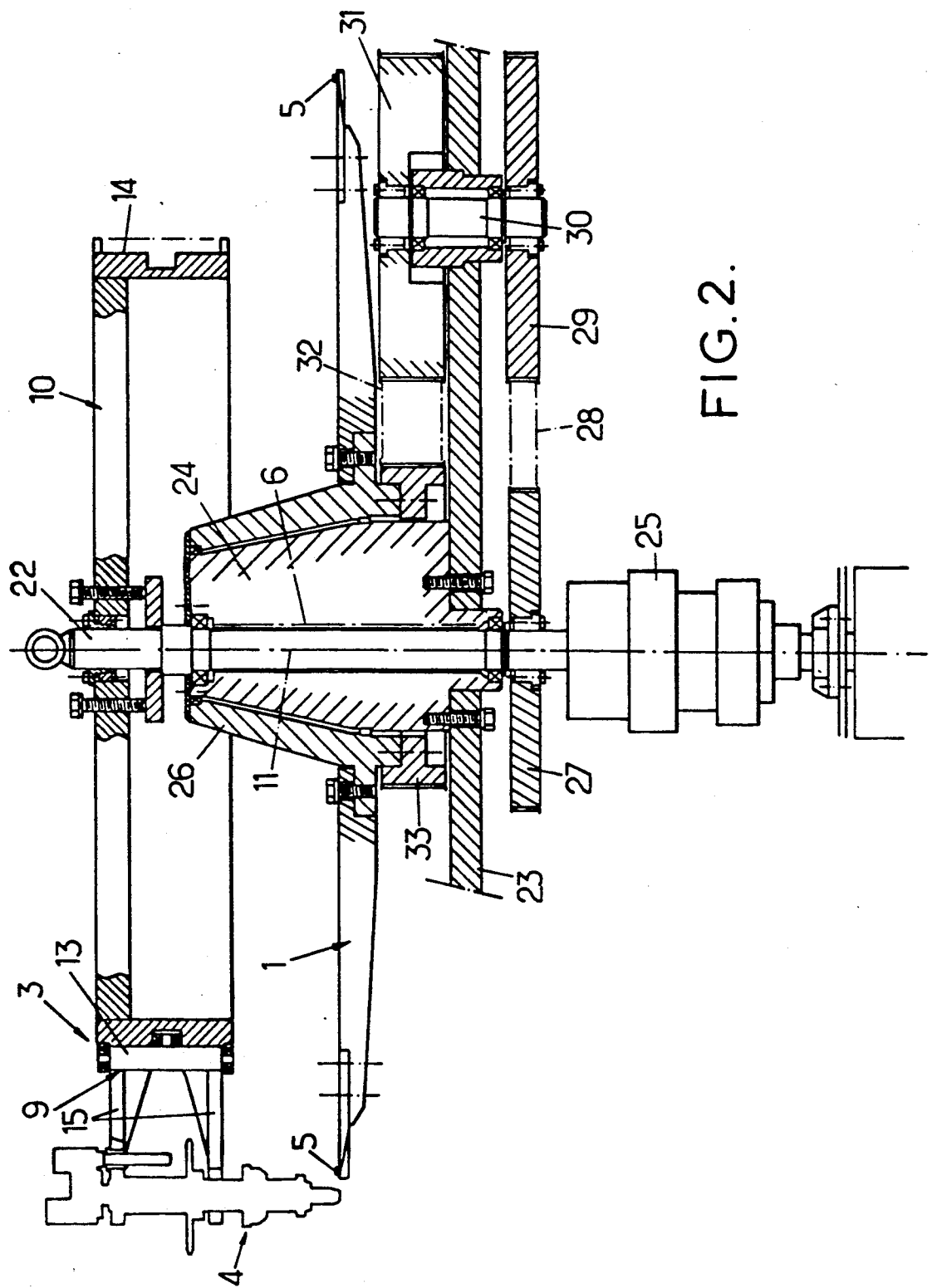
FIG. 2 is a side view in cross-section of the loading apparatus in FIG. 1.

The loading apparatus in FIGS. 1 and 2 basically comprises a revolving disk which picks up the containers fed to it tangentially (e.g., in the direction of the arrow 2) using any feed mechanism known to the specialist (e.g., an endless screw system which grasps the container bodies) and a conveyor 3 equipped with devices 4 for individually gripping the containers fed to it by the disk 1. The conveyor 3 is located above the pick-up disk 1, and both rotate in the same direction.

The containers have necks (they may be bottles or similar articles) and are fed (in the direction of arrow 2) in succession along the path 7, while being spaced apart by a predetermined pitch P using spacing means (not illustrated).

The pick-up disk 1, which rotates around an axis 6, incorporates along its peripheral edge 8 mean for housing container necks formed by a series of recesses 5 spaced circumferentially apart by a pitch also having the value P. These recesses can house the necks of the containers and support the containers by means of a projecting annular flange which encloses the necks and rests on the edges of the recesses.

In the example under consideration, the conveyor 3 is constituted mainly by a jointed structure which forms an endless chain 9 of pivoting links, each of which is configured to support a container by its neck. The conveyor further incorporates a drive wheel 10 of relatively large diameter on which the endless chain 9 is wound, and which supports and drives the chain, as well as motorized means ensuring the synchronous drive of the disk 1 and the drive wheel 10 which turns around an axis 11.

The conveyor chain 9 is formed from a succession of links 12 joined together in free rotation by large-diameter pivot pins 13 capable of fitting into radial recesses 14 provided on the periphery of the wheel 10, which thus supports and drives the chain. Each chain link 12 is fitted with a transverse bifurcated arm 15 extending radially outwardly (when the chain is wound on the wheel 10). The free end of each arm is fitted with a device 4 for gripping a container by its neck.

Figure 3:
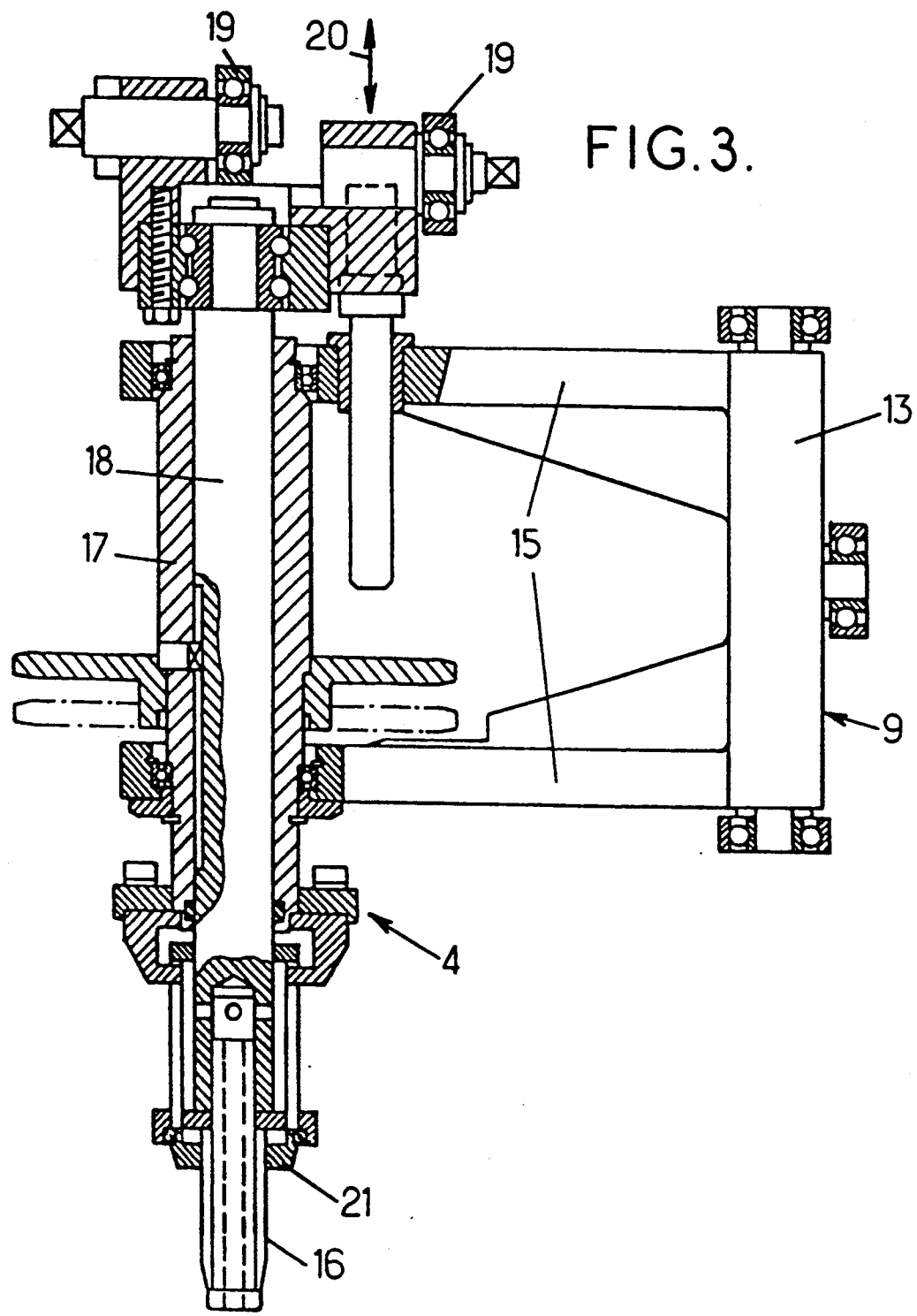
FIG. 3 is a cross-section of a container-gripping device which can equip the loading apparatus in FIGS. 1 and 2.

To make things clearer, FIG. 3 illustrates an embodiment of a gripping device 4 capable of being used with the invention by being mounted at the ends of the arms 15 of the conveyor chain 9. Each gripping device comprises a vertical mandrel 16 which moves in a sleeve 17 supported by the arm 15 so as to rotate freely. The upper end of a rod 18, which extends the mandrel 16 across the sleeve 17 and projects upward beyond it, is fitted with rollers 19 capable of working in conjunction with stationary lateral cams (not shown) in order to raise and lower (double arrow 20) the mandrels 16 sequentially. Each mandrel has an outer calibrated diameter equal to, or slightly smaller than, the inner diameter which the container neck must have. To grip a container by its neck, the mandrel 16 is forcibly driven into the neck of the container until an annular stop 21 enclosing the mandrel 16 and borne by the lower end of the sleeve 17 comes into contact with the upper edge of the neck. When inserted in this way, the mandrel can support the container during its conveyance.

It will be noted that the circular path followed by the housing means and the circular or arc-shaped path followed by the axes of the gripping devices supported by the conveyor have the same radius. Accordingly, in the embodiment described above, the diameter of the toothed wheel 10, the length of the chain links 12, and the length of the arms 15 are determined so that, as soon as the chain is wound on the wheel 10, the ends of the radial arms 15 move or spread away from each other to reach a center or pitch distance between adjacent axes having a value P, which is equal to the center distance between axes with which the subjacent containers are fed by the pick-up disk 1.

Furthermore, the axis 11 of the drive wheel 10 is offset in relation to the axis 6 of the pick-up disk 1 such that the circular or arc-shaped paths mentioned above intersect (in vertical projection) at an angle α of between 2° and 5°, and preferably of about 3°, at a geographically stationary point A. The rotational actuation of the wheel 10 and that of the disk 1 are synchronized such that a gripping device 4 and a recess 5 in the pick-up disk reach point A in synchronism, one perpendicular to the other. Furthermore, at that precise point cams (not shown) control the descent of the mandrel 16 previously raised into the retracted position (double arrow 20 in FIG. 3), and its insertion into the neck of the subjacent container.

It will also be noted that due to the offset between the axis of rotation 6 of the disk in relation to the axis of rotation 11 of the drive wheel 10, beyond the point of intersection A of the paths of the housing means and the gripping devices, the edge 8 of the disk and the recesses 5 for housing the necks move away from the gripping devices toward the inside of the arc-shaped path which the devices follow, so that the housing means from which the respective containers have been unloaded no longer interfere with the containers, which are picked up by the gripping devices.

A layout of this kind proves necessary, in particular, in the configuration illustrated in FIGS. 1 and 2, showing an endless chain equipped with radiating arms, because of the reduced pitch separating the ends of the arms and, therefore, the containers they support, between the curved portion of the path and the rectilinear portion which follows it.

To simplify the structure while ensuring the desired synchronization of the rotational motions of the wheel 1 and of the disk 1, the wheel and the disk are driven by a single motorized device, as illustrated in FIG. 2. The wheel 10 driving the endless chain 9 is supported at the upper end of a substantially-vertical shaft 22 (which defines the axis of rotation of the wheel), to which the wheel is integrally fastened in its rotational motion. The shaft is supported, in turn, on the machine frame 23 by a stationary base 24, through which the shaft passes while allowing free rotation, and the lower end of the shaft 22 is attached to a motorized drive mechanism 25.

The stationary base, or cap 24, has a tapered outer shape, and it will be noted, in particular, that the base is not coaxial to the shaft 22, but instead its axis is offset in relation thereto. The hub 26 of the pick-up disk rests, while rotating freely, on the outer tapered surface of the base 24 by virtue of its matching shape; because of this layout, the pick-up disk is positioned beneath the wheel 10 and rotates around the axis of the tapered support (i.e., the axis of rotation 6), which is offset in relation to the axis 11 of the wheel 10.

The pick-up disk 1 is driven in rotation by the motor shaft 22 via a first wheel 27 locked on the shaft and which, by means of a belt 28, drives a second wheel 29 having a parallel axis and locked on one end of an intermediate shaft 30 supported by the frame 23. A third wheel 31, which is locked on the other end of the shaft 30, drives, via a belt 32, a fourth wheel 33 sharing the axis 6 and integrally attached to the hub 26 of the pick-up disk 1.

The transmission ratios of the assembly 27, 28, 29 and the assembly 31, 32, 33 are such that the gripping devices 4 and the housing means 5 incorporated into the disk arrive in succession and in synchronism at point A.

Obviously, and in consequence of the preceding description, the invention is in no way restricted to those of its embodiments and application considered with greater specificity. To the contrary, it encompasses all variants.

In particular, it will be understood that the conveyor which, in the example described and as illustrated in FIGS. 1 and 2, is formed as an endless chain supported by a drive wheel, may exist as a simple conveyor wheel having the required diameter. Whatever the embodiment adopted, it is necessary only that, within the loading area, the gripping devices follow an arc-shaped path having the same radius as the disk and centered on an axis offset in relation to the axis of rotation of the disk.

Similarly, the gripping devices may be constructed in any form other than that illustrated as an example and shown in FIG. 3.

I claim:

1. Apparatus for loading containers having necks, in particular bottles, on a conveyor (3) equipped with devices (4) for individually gripping said containers by their necks, the gripping devices (4) being spaced apart by a predetermined pitch (P) and the containers being fed (2,7) in succession to said apparatus while being spaced apart by said pitch, wherein said apparatus comprises:
   a) a circular or arc-shaped conveyor (3) disposed in a container-loading area, said conveyor turning in a given direction around an axis of rotation (11) and said gripping devices (4) being supported by the conveyor and describing, in the container-loading area, an arc-shaped path having a predetermined diameter and extending around said axis;
   b) a rotatable disk (1) for picking up containers fed to the apparatus, equipped at or near a periphery thereof with individual container-housing means (5) defining a mutual spacing pitch identical to said predetermined pitch (P), said disk being positioned beneath said conveyor and rotating in the same direction thereas around an axis (6) parallel to the axis of said conveyor, the diameter of the disk and the respective positions of said axes of the conveyor and the disk being such that, in a plane projection, the circular path of the housing means intersects (A) the arc-shaped path of the gripping devices;
   c) means for controlling the gripping devices such that said gripping devices individually grip the container necks at an instant when they arrive at said point of intersection of said paths; and
   d) means for synchronously rotationally driving the conveyor and the pick-up disk, such that the gripping devices arrive in succession at said point of intersection of the paths in synchronism with the housing means, wherein said disk is configured so that the container-housing means (5) follow a circular path having said predetermined diameter and the axis (6) of rotation of the disk is spaced apart from the axis of rotation (11) of the conveyor so as to form said point of intersection of the respective paths of the gripping devices and the housing means.

2. Apparatus according to claim 1, wherein the angle of intersection of the paths is between 2° and 5°, and preferably 3°.

3. Apparatus according to claim 1, wherein said apparatus comprises:
   a) a vertical rotatable shaft (22) supporting said conveyor (3);
   b) a stationary cap (24) through which said shaft passes in free rotation and which is offset in relation to said shaft; and
   c) a revolving hub (26) mounted in free rotation around said cap, the hub being fastened to the disk (1), which is disposed below the conveyor (3).

4. Apparatus according to claim 3, wherein the synchronous drive means actuating said conveyor and said disk comprise:
   a) a motor (25) for driving said shaft in rotation;
   b) an intermediate shaft (30) parallel to said motor driven shaft and offset in relation thereto;
   c) a first rotational-motion transmission (27,28, 29) coupling the motor driven shaft (22) and the intermediate shaft (30) to drive the intermediate shaft in rotation; and
   d) a second rotational-motion transmission (31, 32, 33) coupling the intermediate shaft (30) and the disk hub (26), the transmission ratios of the first and second transmissions being such that the gripping devices and the housing means reach in succession the point of intersection of their respective paths.

5. Apparatus according to claim 4, wherein said first and second rotational-motion transmissions are belt-and-pulley transmissions.

6. Apparatus according to claim 3, wherein said conveyor (3) comprises an endless conveyor chain (9) equipped with said gripping devices (4), and a wheel (10) supporting and driving said chain rotating around said axis of rotation (11), said gripping devices (4) describing said arc-shaped path having a predetermined diameter when said chain travels over said wheel.

7. Apparatus according to claim 6, wherein said vertical rotating shaft (22) supports said wheel (10) driving said endless chain (9).

8. Apparatus for loading containers having necks, in particular bottles, on a conveyor (3) equipped with devices (4) for individually gripping said containers by their necks, the gripping devices (4) being spaced apart by a predetermined pitch (P) and the containers being fed (2,7) in succession to said apparatus while being spaced apart by said pitch, wherein said apparatus comprises:

a) a circular or arc-shaped conveyor (3) disposed in a container-loading area, said conveyor turning in a given direction around an axis of rotation (11) and said gripping devices (4) being supported by the conveyor and describing, in the container-loading area, an arc-shaped path having a predetermined diameter and extending around said axis;

b) a rotatable disk (1) for picking up containers fed to the apparatus, equipped at or near a periphery thereof with individual container-housing means (5) defining a mutual spacing pitch identical to said predetermined pitch (P), said disk being positioned beneath said conveyor and rotating in the same direction thereas around an axis (6) parallel to the axis of said conveyor, the diameter of the disk and the respective positions of said axes of the conveyor and the disk being such that, in a plane projection, the circular path of the housing means intersects (A) the arc-shaped path of the gripping devices;

c) means for controlling the gripping devices such that said gripping devices individually grip the container necks at an instant when they arrive at said point of intersection of said paths; and d) means for synchronously rotationally driving the conveyor and the pick-up disk, such that the gripping devices arrive in succession at said point of intersection of the paths in synchronism with the housing means, wherein the axis (6) of rotation of the disk is offset in relation to the axis (11) of rotation of the conveyor, so that, beyond the point of intersection, in the direction of rotation, the housing means (5) move away from the gripping devices (4) toward an inside of the arc-shaped path followed thereby, such that the housing means from which the containers have been unloaded no longer interfere with said containers grasped by the gripping devices.

* * * * *